(12) United States Patent
Dalton et al.

(10) Patent No.: US 9,586,535 B2
(45) Date of Patent: Mar. 7, 2017

(54) VEHICLE INTERIOR TRIM ASSEMBLY

(71) Applicant: Nissan North America, Inc., Franklin, TN (US)

(72) Inventors: Darin Dalton, Farmington Hills, MI (US); Ashley Tennant, Livonia, MI (US); Michael Eberlein, Plymouth, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/645,925

(22) Filed: Mar. 12, 2015

(65) Prior Publication Data

US 2016/0264068 A1    Sep. 15, 2016

(51) Int. Cl.
*B60R 13/02* (2006.01)
*B60R 13/06* (2006.01)

(52) U.S. Cl.
CPC .......... *B60R 13/0256* (2013.01); *B60R 13/02* (2013.01); *B60R 13/06* (2013.01); *B60R 2013/0287* (2013.01); *B60R 2013/0293* (2013.01)

(58) Field of Classification Search
CPC .. B60R 13/0256; B60R 13/0262; B60R 13/06
USPC ...................................... 296/24.34, 70, 1.08
See application file for complete search history.

(56) References Cited

U.S. PATENT DOCUMENTS 3,356,409 A * 12/1967 Belsky ................. B60N 2/4686
                                                              224/275
5,267,739 A * 12/1993 Vaughan .................. B60J 10/00
                                                              277/642
5,927,786 A *  7/1999 Kawai ................. B60R 13/0206
                                                              296/203.03
7,722,113 B2*  5/2010 Kamiya ................ B60R 13/025
                                                              296/1.08
7,954,851 B2   6/2011 Sato
8,282,145 B2  10/2012 Vasko et al.
8,297,645 B2  10/2012 Thurston et al.
8,297,674 B2  10/2012 She (Continued)

FOREIGN PATENT DOCUMENTS

EP    0258877 A2 *  3/1988
JP    3278073 B      4/2002

OTHER PUBLICATIONS

Unpublished U.S. Appl. No. 14/291,642, filed May 30, 2014, entitled Meter Cluster Seal.

*Primary Examiner* — Jason S Morrow
(74) *Attorney, Agent, or Firm* — Global IP Counselors, LLP (57) ABSTRACT

A vehicle interior trim assembly includes a passenger compartment, a first trim assembly, a second trim assembly and a flexible seal member. The first trim assembly is fixedly installed within the passenger compartment and has a first surface. The second trim assembly is fixedly installed within the passenger compartment and has a second surface adjacent to the first surface of the first trim assembly. The first surface and the second surface are spaced apart from one another defining a gap therebetween. The flexible seal member is attached to the one of the first surface and the second surface. The flexible seal member extends along the gap between the first and second surfaces contacting both the first surface and the second surface thereby covering the gap.

5 Claims, 10 Drawing Sheets

(56) References Cited

U.S. PATENT DOCUMENTS

2006/0230686 A1* 10/2006 Plum .................. B60J 5/0405
49/498.1
2008/0203754 A1* 8/2008 Towne ............... B60R 13/0256
296/93

* cited by examiner

VEHICLE INTERIOR TRIM ASSEMBLY

BACKGROUND

Field of the Invention

The present invention generally relates to a vehicle interior trim assembly. More specifically, the present invention relates to vehicle interior trim assembly that includes a flexible seal member installed between two adjacent interior trim assemblies.

Background Information

Trim assemblies, such as the center console and an adjacent portion of an instrument panel are complex structures to design, manufacture and install to corresponding areas of the passenger compartment of a vehicle. Further, due to engineering tolerances, the exact location of an intersection between two such trim assemblies is typically defined as a region with measureable deviations.

SUMMARY

One object of the disclosure is to provide a structure that covers a gap between two interior trim assemblies.

In view of the state of the known technology, one aspect of the present disclosure is a vehicle interior trim assembly that is installed within a passenger compartment of a vehicle structure. A first trim assembly is fixedly installed within the passenger compartment and has a first surface. The second trim assembly is also fixedly installed within the passenger compartment and has a second surface located adjacent to the first surface of the first trim assembly. The first surface and the second surface are spaced apart from one another defining a gap therebetween. A flexible seal member is attached to the one of the first surface and the second surface. The flexible seal member extends along the gap between the first and second surfaces contacting both the first surface and the second surface thereby covering the gap.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
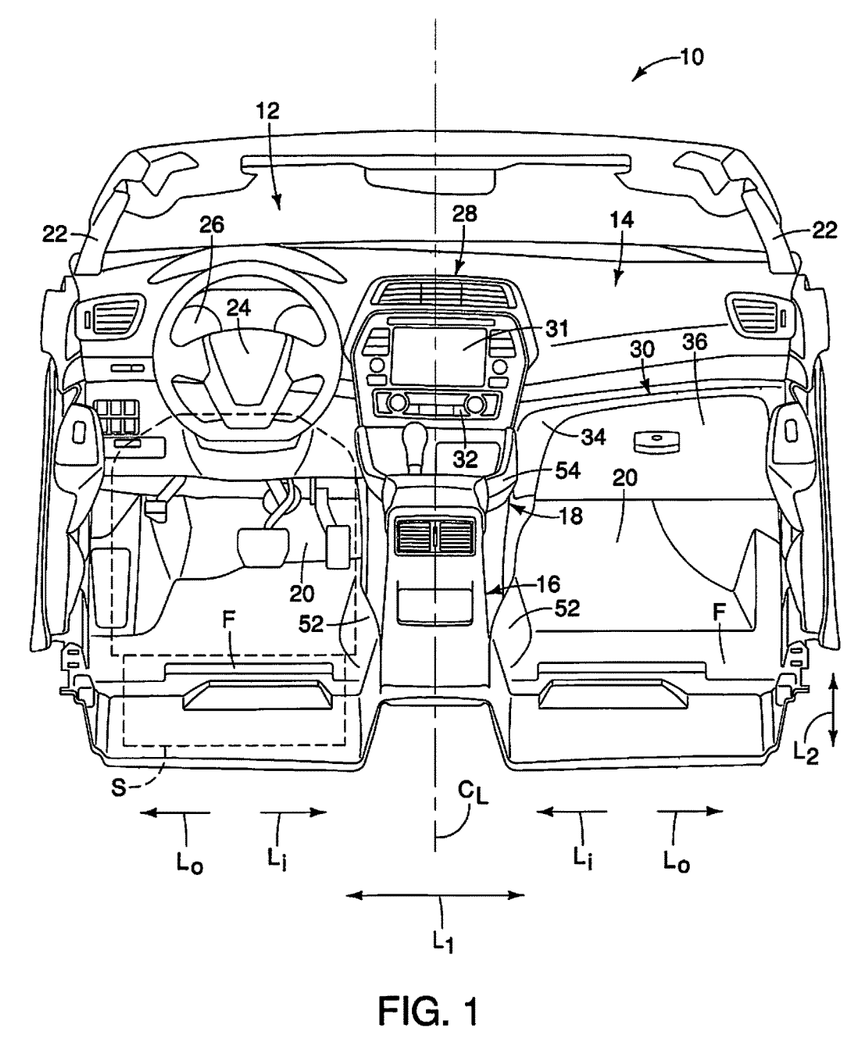
FIG. 1 is a perspective view of a passenger compartment of a vehicle that includes an interior trim assembly with an instrument panel assembly and a center console assembly in accordance with a first embodiment.
Figure 2:
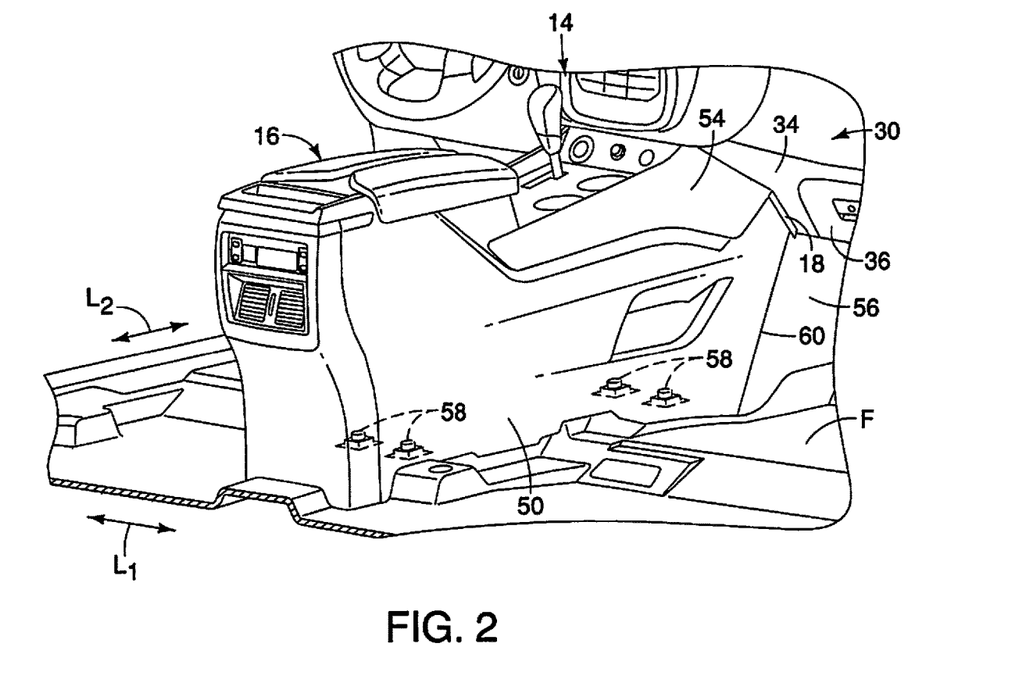
FIG. 2 is another perspective view of the passenger compartment showing the center console assembly and portions of the instrument panel assembly with a flexible seal member covering a gap between a forward end of the instrument panel and a lower edge of the instrument panel assembly in accordance with the first embodiment.

Referring initially to FIG. 1, a vehicle 10 with structure that defines a passenger compartment 12 therein is illustrated in accordance with a first embodiment. As shown in FIGS. 1 and 2, the passenger compartment 12 has an instrument panel assembly 14 (a first trim assembly), a center console assembly 16 (a second trim assembly) and a flexible seal member 18 installed therebetween in a manner described in greater detail below.

As shown in FIG. 1, the vehicle 10 and the passenger compartment 12 define several directions. Specifically, a vehicle lateral direction $D_1$ (side-to-side) is defined. Further, an imaginary center line $C_L$ extends approximately through a center of the vehicle 10 in a vehicle longitudinal direction $L_2$, also shown in FIG. 1. As well, inboard directions $L_i$ and outboard directions $L_o$ are also defined, where the inboard directions $L_i$ are defined as directions parallel to the vehicle lateral direction $D_1$ extending toward the center line $C_L$ and the outboard directions $L_o$ are defined as directions parallel to the vehicle lateral direction $D_1$ extending away from the center line $C_L$.

The passenger compartment 12 of the vehicle 10 is at least partially defined by vehicle structure that includes a floor F, a dash wall 20 and A-pillars 22. The dash wall 20 is an upright wall structure of the vehicle 10 that separates the passenger compartment 12 from an engine compartment (not shown). The A-pillars 22 are conventional elements, and therefore further description is omitted for the sake of brevity. FIG. 1 has been simplified, only showing the floor F, the dash wall 20 and the A-pillars 22 of the structure that defines the passenger compartment 12 of the vehicle 10. However, it should be understood from the drawings and the description herein that the passenger compartment 12 is defined by further conventional structural elements (not shown) whose description is omitted for the sake of brevity.

The instrument panel assembly 14 (the first trim assembly) is fixedly attached to the dash wall 20 in a conventional manner. For example, the instrument panel assembly 14 is attached to the dash wall 20 by a plurality of mechanical fasteners (not shown). More specifically, the instrument panel assembly 14 is non-movably fixed to the dash wall 20.

The instrument panel assembly 14 includes, for example, a steering column assembly 24, an instrument cluster 26, a center stack assembly 28 and a storage compartment 30. The center stack assembly 28 includes, among other features, an audio/video assembly 31 and a climate control panel 32. The storage compartment 30 includes a surround trim panel 34 that at least partially surrounds a compartment door 36.

Figure 3:
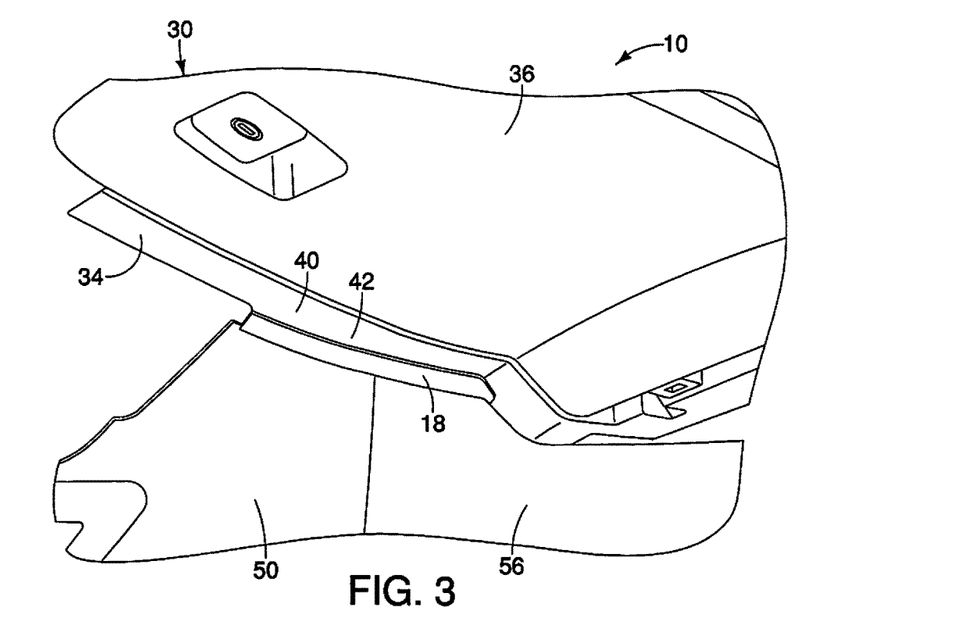
FIG. 3 is another perspective view of a portion of the passenger compartment showing upper edge portions of the center console assembly and an adjacent surface of the instrument panel, with the flexible seal member covering a gap therebetween in accordance with the first embodiment.
Figure 4:
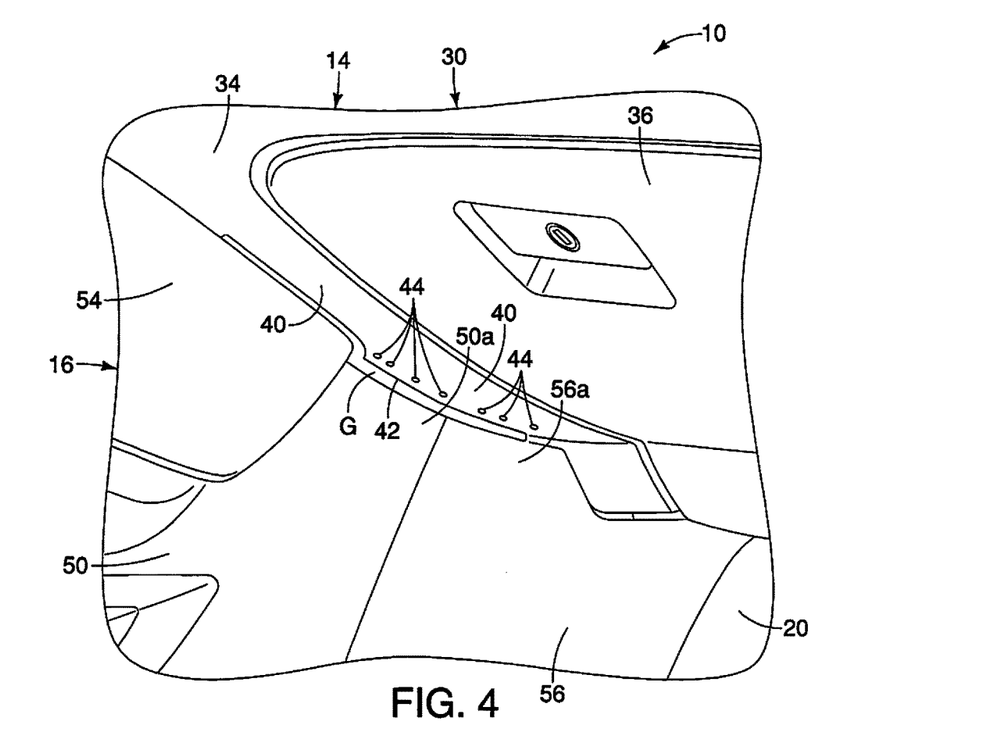
FIG. 4 is another perspective view of the portion of the passenger compartment similar to FIG. 3, showing the upper edge portions of the center console assembly and an adjacent surface of the instrument panel, with the flexible seal member removed showing the gap therebetween in accordance with the first embodiment.

As shown in FIGS. 3 and 4, the surround trim panel 34 of the storage compartment 30 has a surface 40 located between an inboard side of the compartment door 36 and the center console assembly 16. Adjacent to an inboard edge 42 of the surface 40 the surround trim panel 34 is provided with a plurality of apertures 44, whose function is described further below.

The central stack assembly 28 of the instrument panel assembly 14 is located above the center console assembly 16 with both the instrument panel assembly 14 and the center console 16 installed within the passenger compartment 12 of the vehicle 10. In the depicted embodiment, the central stack assembly 28 is angled slightly toward the driver's seat S such a vehicle operator seated in the driver's seat can easily view and operate the controls of the audio/video assembly 28 and the climate control panel 30. A more detailed description of the center stack assembly 18 is provided in application Ser. No. 14/069,987, filed Nov. 1, 2013. Application Ser. No. 14/069,987 is incorporated herein by reference in its entirety.

As shown in FIGS. 1 and 2, the center console assembly 16 (the second trim assembly) includes a plurality of panels and features. For example, the center console 16 includes, among other features, a main body 50, lower side surfaces 52, upper side panels 54 and a forward kick panel 56 (shown in FIGS. 2 and 4). The main body 50 is basically a box-like support structure that includes mounting structures 58 (shown in phantom in FIG. 2). The mounting structures 58 are configured and positioned to fixedly attach the center console assembly 16 to the floor F via, for instance, mechanical fasteners. The center console assembly 16 is attached to the floor F within the passenger compartment 12 between the front seats S.

The lower side surfaces 52 can be integrally manufactured with the main body 50, or can be formed as separate panels that are attached to opposite sides of the main body 50. The upper side panels 54 are attached to upper sides of the main body 50 covering an upper portion of the lower side surfaces 52. Further, the center console assembly 16 can be constructed in a manner that is described in, for example, application Ser. No. 14/180,733, filed Feb. 14, 2014. Application Ser. No. 14/180,733 is incorporated herein by reference in its entirety. However, the center console assembly 16 described herein differs from the center console assembly described in application Ser. No. 14/180,733 in that the center console assembly 16 is not directly attached to or directly connected to the instrument panel assembly 14. In other words, the center console assembly 16 is installed to the floor F in the absence of a mechanical connection to the instrument panel assembly 14.

As shown in FIG. 4, the forward kick panel 56 is attached to the center console assembly 16 and extends from a forward end of the main body 50 to the dash wall 20. A seam 60 is defined between the main body 50 and the forward kick panel 56. The attachment structure of the forward kick panel 56 (not shown) can include mechanical fasteners, clips and/or snap-fitting structures. Since such structures are conventional, further description is omitted for the sake of brevity.

The exposed trim surface of the forward kick panel 56 can be flush with an adjacent portion of the exposed trim surface of the main body 50, or can be slightly offset (non-coplanar). Further, the exposed trim surface of the forward kick panel 56 can be angularly offset from the exposed trim surface of the main body 50. In other words, it is not necessary for the exposed trim surface of the forward kick panel 56 and the exposed trim surface of the main body 50 to be co-planar or continuous.

As shown in FIG. 4, the exposed trim surface of the main body 50 includes an upper edge portion that is adjacent to the inboard edge 42 of the surround trim panel 34. Similarly, the exposed trim surface of the forward kick panel 56 includes an upper edge portion 56a that is adjacent to the inboard edge 42 of the surround trim panel 34.

Once the instrument panel assembly 14 and the center console assembly 16 are installed in the vehicle 10 within the passenger compartment 12, a gap G is defined between the surface 40 of the surround trim panel 34 and the main body 50, as shown in FIG. 4 with the flexible seal member 18 removed. More specifically, the gap G is defined between the surface 40 and the upper edge portions 50a and 56a. The flexible seal member 18 is provided in order to cover and conceal the gap G, as described in greater detail below.

Figure 7:
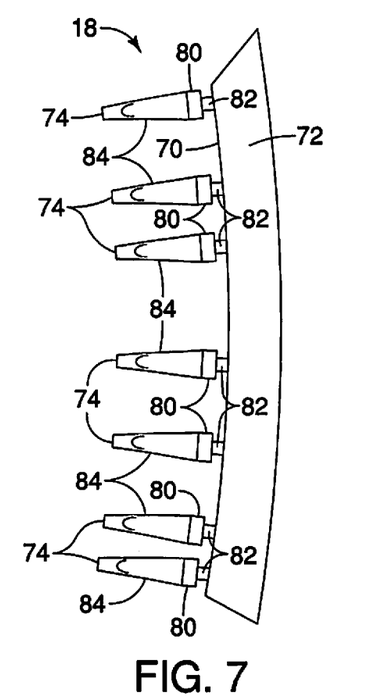
FIG. 7 is a side view of the flexible seal member showing a base portion, a lip portion and fastening projection in accordance with the first embodiment.
Figure 8:
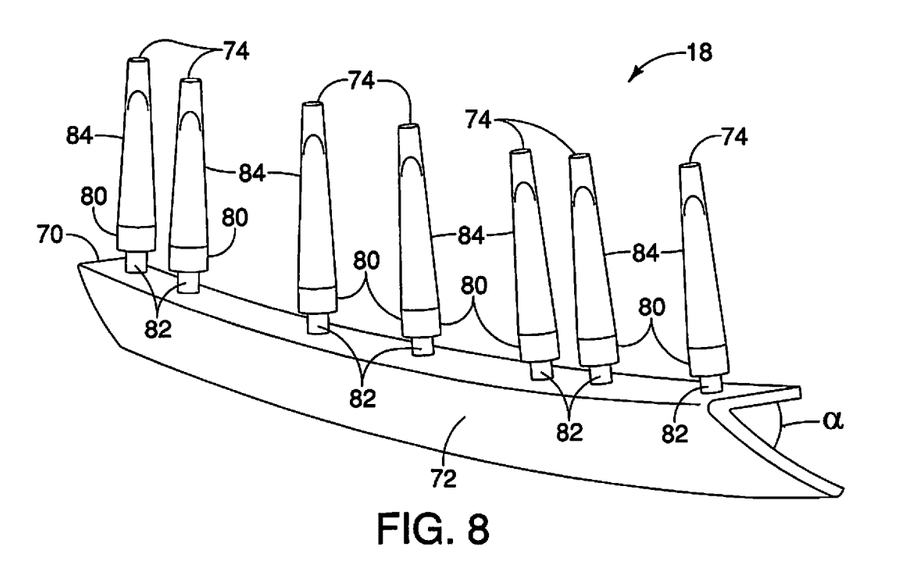
FIG. 8 is a perspective view of the flexible seal member showing further details of the base portion, the lip portion and the fastening projection in accordance with the first embodiment.

A description of the flexible seal member 18 in accordance with the first embodiment is now provided with specific reference to FIGS. 5-13. As shown in FIGS. 5-8, the flexible seal member 18 includes a base portion 70, a lip portion 72 and fastening projections 74. As shown in FIGS. 7 and 8, the base portion 70 is a generally flat or planar portion in an uninstalled state. The lip portion 72 extends from one edge of the base portion 70 and has an overall length that is equal to or greater than the overall length of the base portion 70. The lip portion 72 can be formed with a slight curvature, as shown in FIG. 8. However, the lip portion 72 can alternatively be relatively planar throughout its length. The lip portion 72 is shaped with respect to the base portion 70 such that the lip portion 72 is biased into contact with the upper edge portion 50a and the upper edge portion 56a of the center console assembly 16, as is discussed in greater detail below. The lip portion 72 extends from the base portion 70 defining an angle α (FIG. 8), where the angle α is an angle that is somewhere between 30 degrees and 70 degrees.

Each of the fastening projections 74 extends from the base portion 70 and includes a retaining portion 80, a recessed portion 82 and a removable portion 84. The retaining portion 80 has an outer diameter that is greater than the diameter of the apertures 44 of the inboard edge 42 of the surround trim panel 34. The recessed portion 82 and the removable portion 84 have outer diameters that are the same or less than the diameter of each of the apertures 44 in the surround trim panel 34. The recessed portion 82 is located between the retaining portion 80 and the base portion 70.

Figure 5:
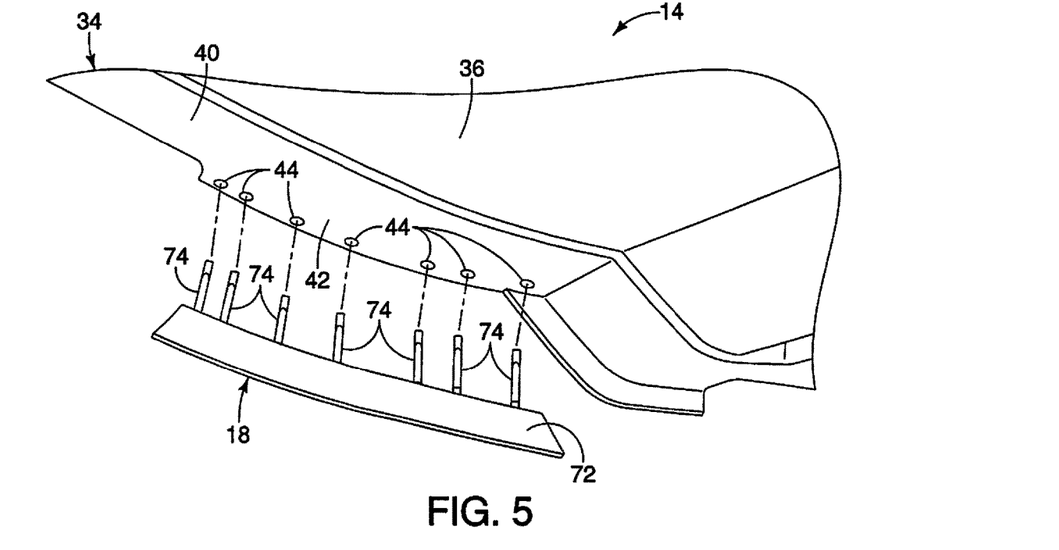
FIG. 5 is an exploded perspective view of the portion of the passenger compartment showing the surface of the instrument panel assembly just prior to installation of the flexible seal member in accordance with the first embodiment.
Figure 6:
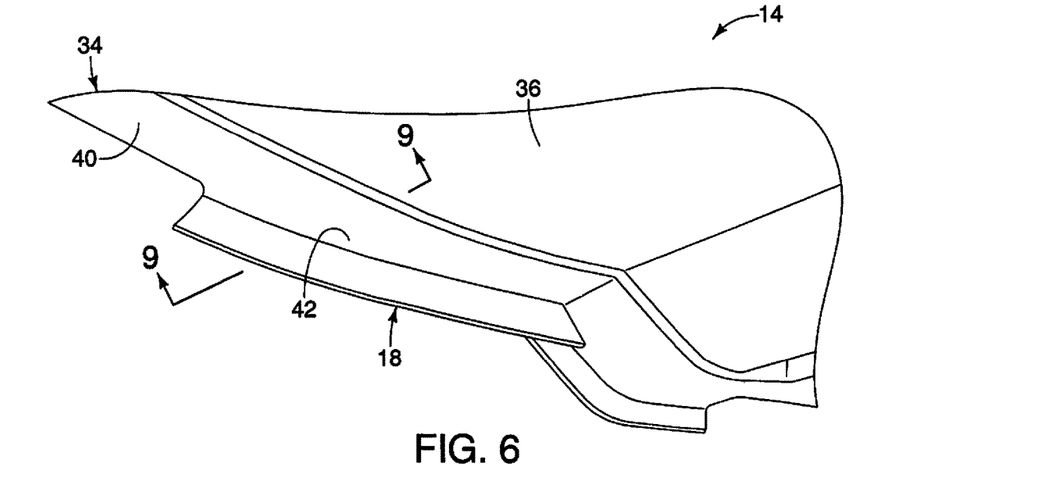
FIG. 6 is a perspective view similar to FIG. 5 showing the flexible seal member installed to the surface of the instrument panel assembly in accordance with the first embodiment.
Figure 9:
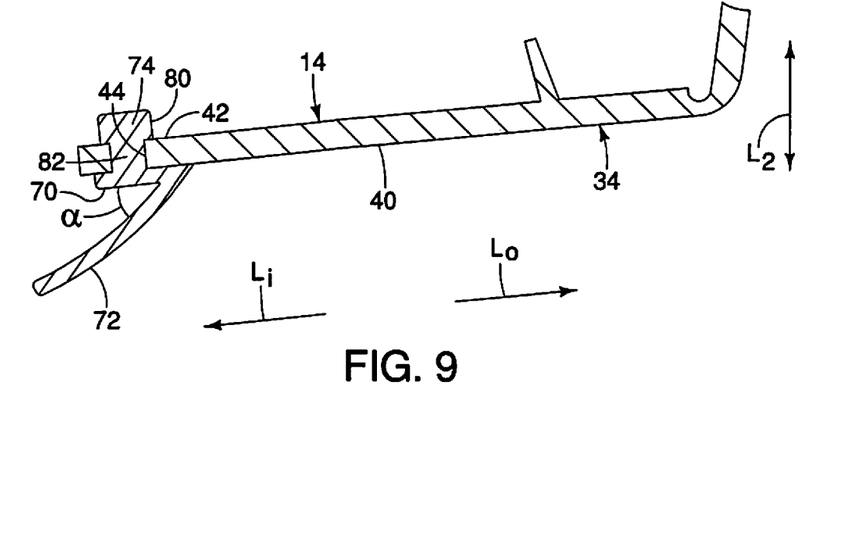
FIG. 9 is a cross-sectional view of the portion of the instrument panel assembly taken along the line 9-9 in FIG. 6, showing the flexible seal member installed to the instrument panel with the lip portion in its molded shape in accordance with the first embodiment.
Figure 10:
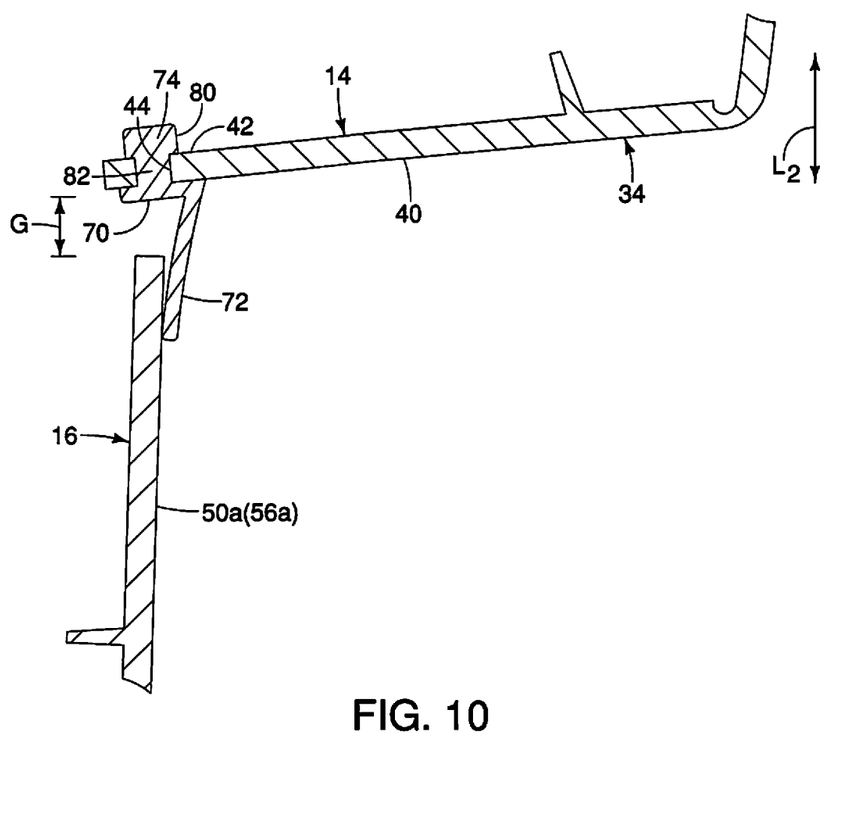
FIG. 10 is another cross-sectional view of the portion of the instrument panel assembly also showing the upper edge portion of the center console with the lip portion of the flexible seal member biased into contact with the center console in accordance with the first embodiment.

As shown in FIG. 5, the flexible seal member 18 is installed to the surround trim panel 34 by inserting the fastening projections 74 into the apertures 44. The fastening projections are elongated members that can be pulled by a technician to ensure that the base portion 70 directly contacts the surface 40 of the surround trim panel 34 at the inboard edge 42. Further, during installation, the removable portion 84 is pulled until the retaining portion 80 is forced through the corresponding aperture 44 in the surround trim panel 34 of the instrument panel assembly 14. Hence, once properly installed, the recessed portion 82 is the only portion of the fastening projection 74 that is located within the aperture 44, as shown in FIGS. 9 and 10. Thereafter, the fastening projections 74 can be cut away leaving the recessed portion 82 and the retaining portion 80 intact thereby securing the flexible seal member 18 to the surround trim panel 34, as is also shown in FIGS. 9 and 10.

The base portion 70, the lip portion 72 and the fastening projections 74 are all formed as a single, unitary, monolithic element. Further, in the depicted embodiments, all portions of the flexible seal member 18 are made of the same flexible, resilient material. For example, the flexible seal member 18 can be made of any of a variety of molded thermoplastic elastomers, such as ethylene propylene diene monomer (M-class) rubber, or other polymer, rubber-like material, so long as the material provides the flexible seal member 18 with flexible and resilient physical properties and characteristics. Further, the flexible seal member 18 can be an extruded member or molded member.

As shown in FIG. 9, once the flexible seal member 18 is installed, the lip portion 72 extends from the base portion 70 in the inboard direction $D_i$. Since the flexible seal member 18 is made of flexible material, the base portion 70 can conform to any shape that may be provided to the surround trim panel 34. Specifically, if the surround trim panel 34 is provided with a non-planar shape, such as the overall curved shape shown in FIGS. 5 and 6, the base portion 70 of the flexible seal member 18 flexes and conforms to the overall shape of the surface 40 of the surround trim panel 34.

Similarly, the lip portion 72 is flexible and contacts the adjacent portions of the main body 50 and the forward kick panel 56 of the center console assembly 16. More specifically, the lip portion 72 presses against the upper edge portion 50a of the main body 50 and the upper edge portion 56a of the forward kick panel 56, as shown in FIGS. 3 and 10-14.

The lip portion 72 has a slight curvature and is inclined relative to the base portion by the angle α. Consequently, as shown in FIG. 10, once the center console assembly 16 is installed within the passenger compartment 12 and the flexible seal member 18 is installed to the instrument panel assembly 14, the lip portion 72 is biased into contact with the upper edge portion 50a and the upper edge portion 56a covering and concealing the gap G.

Further, the flexible seal member 18 can alternatively be attached to the center console assembly 16 such that it overlays the upper edge portion 50a and the upper edge portion 56a of the center console assembly 16 and contacts the surface 40 of the surround trim panel 34, covering and concealing the gap G. Hence, the flexible seal member 18 attaches to the one of the instrument panel assembly 14 (a first trim assembly) and the center console assembly 16 (a second trim assembly) such that the flexible seal assembly 18 extends along the gap G between surface 40 (a first surface) and the adjacent surfaces of the center console assembly 16 (a second surface) contacting both and thereby covering the gap G.

In the design and subsequent manufacturing process of the vehicle 10, engineering tolerances are taken into consideration with respect to the positioning of the instrument panel assembly 14 and the center console assembly 16. Specifically, the instrument panel assembly 14 and the center console assembly 16 are not directly attached to one another by fasteners or other mechanical engagements, as mentioned above. Therefore, the front end of the center console assembly 16 will likely not align at exactly the same location relative to the instrument panel assembly 14, within the predetermined engineering tolerances. For example, the instrument panel assembly 14 is fixed to the dash wall 20. In a vehicle-to-vehicle comparison, the instrument panel assembly 14 may be offset in the vehicle lateral direction $D_1$ by one or more millimeters, within the predetermined tolerances. In that same vehicle-to-vehicle comparison, the instrument panel assembly 14 may be offset vertically by one or more millimeters, within the predetermined tolerances. Similarly, the center console assembly 16 is attached to the floor F by the mounting structures 58. In a vehicle-to-vehicle comparison, the center console assembly 16 may be offset in the vehicle lateral direction $D_1$ by one or more millimeters relative to the instrument panel assembly 16, within the predetermined tolerances. Hence, the size of the gap G may vary slightly vehicle-to-vehicle, as shown in FIGS. 10-14.

Specifically, FIG. 10 shows an ideal alignment between instrument panel assembly 14 and the center console assembly 16. The gap G is covered by the flexible seal member 18 in FIG. 10. Further, in FIG. 10, the lip portion 72 of the flexible seal member 18 is flexed in a manner predicted by vehicle designers.

Figure 11:
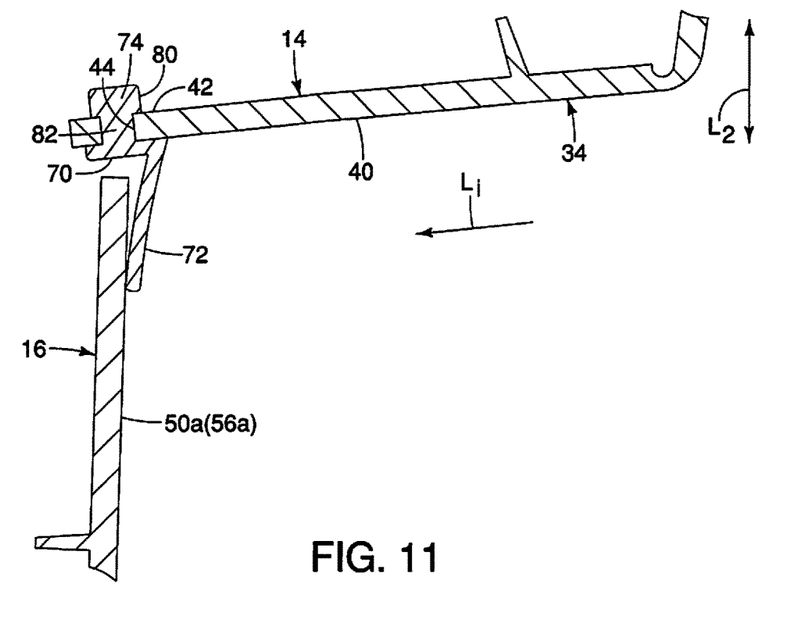
FIG. 11 is another cross-sectional view of the portion of the instrument panel assembly similar to FIG. 10 showing the center console shifted forward within engineering tolerances with the lip portion of the flexible seal member biased into contact with the center console in accordance with the first embodiment.

In FIG. 11, within the engineering tolerances of the vehicle 10, the center console assembly 16 is shifted in a forward direction relative to the vehicle longitudinal direction $L_2$ toward the instrument panel assembly 14, as compared to the state shown in FIG. 10. In this state, the flexible seal member 18 adequately covers the gap G (reduced in size relative to FIG. 10).

Figure 12:
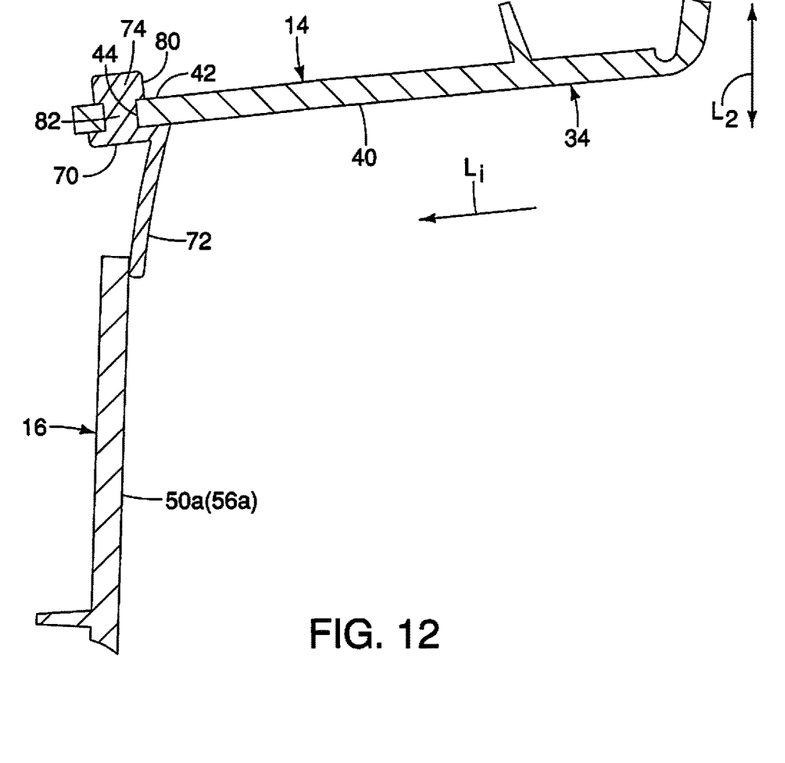
FIG. 12 is another cross-sectional view of the portion of the instrument panel assembly similar to FIGS. 10 and 11 showing the center console shifted rearward within engineering tolerances with the lip portion of the flexible seal member biased into contact with the center console in accordance with the first embodiment.

In FIG. 12, within the engineering tolerances of the vehicle 10, the center console assembly 16 is shifted in a rearward direction relative to the vehicle longitudinal direction $L_2$ away the instrument panel assembly 14, as compared to the state shown in FIG. 10. Again, in this state, the flexible seal member 18 adequately covers the gap G (increased in size relative to FIG. 10).

Figure 13:
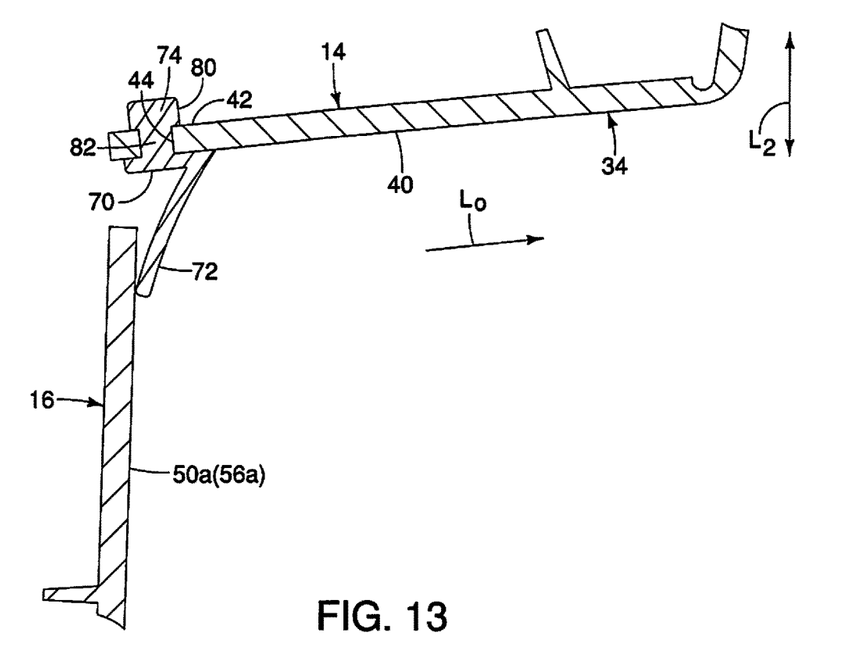
FIG. 13 is another cross-sectional view of the portion of the instrument panel assembly similar to FIGS. 10-12 showing the center console shifted toward a first side within engineering tolerances with the lip portion of the flexible seal member biased into contact with the center console in accordance with the first embodiment.

In FIG. 13, within the engineering tolerances of the vehicle 10, the center console assembly 16 is shifted in toward the driver's side of the vehicle, as compared to the state shown in FIG. 10. Again, in this state, the flexible seal member 18 adequately covers the gap G. The flexing of the lip portion 72 of the flexible seal member 8 is reduced slightly as shown in FIG. 13.

Figure 14:
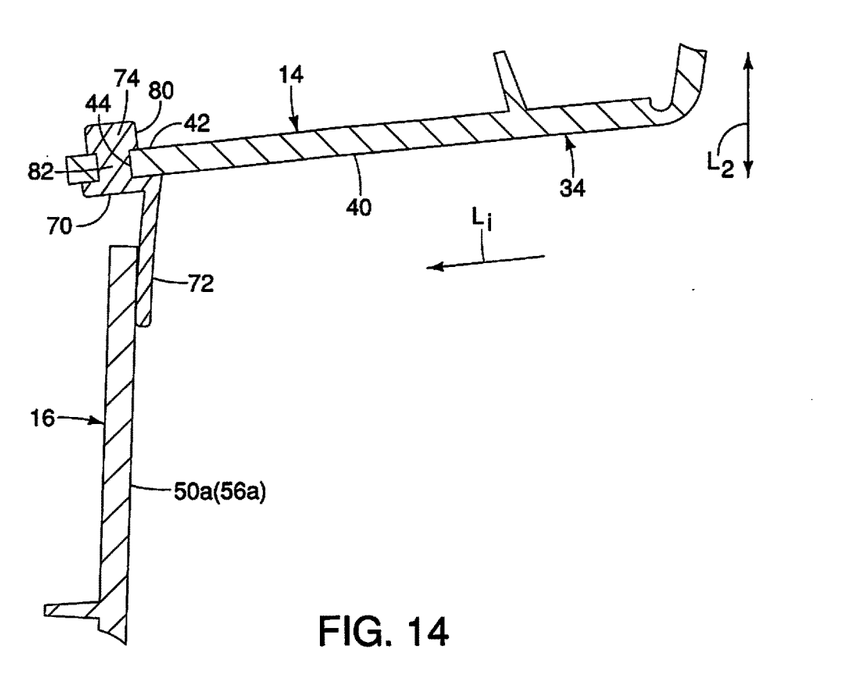
FIG. 14 is yet another cross-sectional view of the portion of the instrument panel assembly similar to FIGS. 10-13 showing the center console shifted toward a second side opposite the first side within engineering tolerances with the lip portion of the flexible seal member biased into contact with the center console in accordance with the first embodiment.

In FIG. 14, within the engineering tolerances of the vehicle 10, the center console assembly 16 is shifted away the driver's side of the vehicle toward the passenger's side of the vehicle 10, as compared to the state shown in FIG. 10. Again, in this state, the flexible seal member 18 adequately covers the gap G. The flexing of the lip portion 72 of the flexible seal member 8 is increased slightly as shown in FIG. 13.

Consequently, within prescribed engineering tolerances, the flexible seal member 18 extends over the gap G and conceals the gap G.

In the first embodiment, the recessed portions 82 of the fastening projections 74 of the flexible seal member 18 are located within the apertures 44. The recessed portions 82 constitute first recesses of the flexible seal member 18. A concaved area between the base portion 70 and the lip portion 72 constitutes a second recess of the flexible seal member 18, receiving the upper edge portions 50a and 56a.

Figure 15:
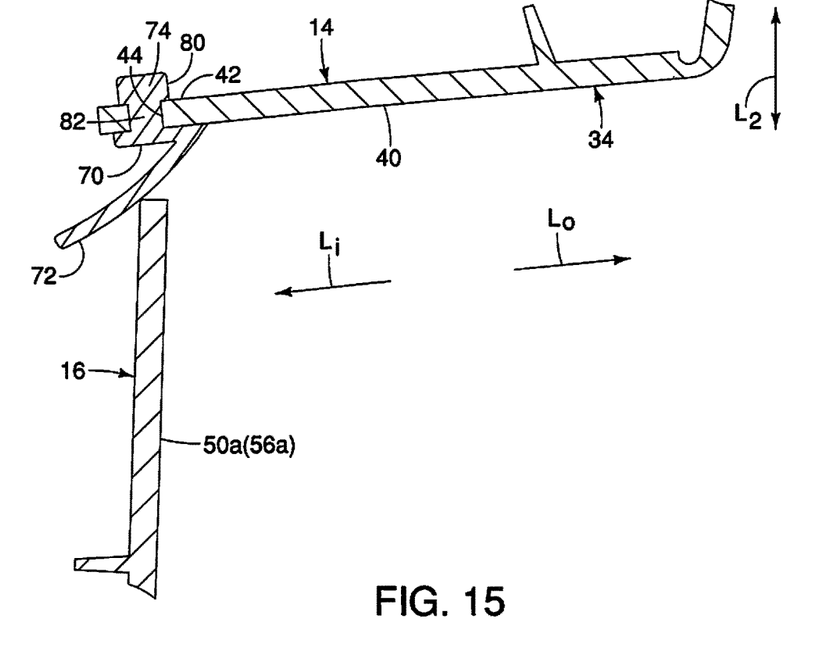
FIG. 15 is another cross-sectional view of the portion of the instrument panel assembly showing a modification to the installation of the flexible seal member depicted in FIGS. 10-14 showing the lip portion of the flexible seal member biased into contact with an inboard surface of the center console in accordance with the first embodiment.

FIG. 15 shows a slight modification to the first embodiment in that the lip portion 72 of the flexible seal member 18 is located along an inboard side of the main body 50 and the forward kick panel 56. In this modification, the lip portion 72 is biased against the inboard side of the main body 50 and the forward kick panel 56 instead of the outboard side thereof. In the modification of the first embodiment shown in FIG. 15, the gap G is eliminated in a differing manner.

Second Embodiment

Figure 16:
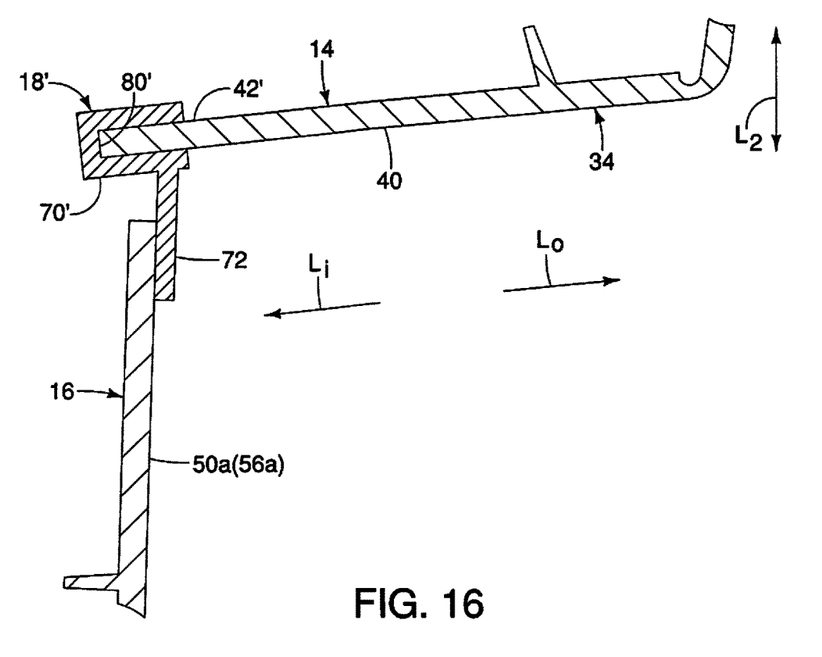
FIG. 16 is a cross-sectional view of the portion of the instrument panel assembly similar to FIGS. 10-13 showing a flexible seal member in accordance with a second embodiment.

Referring now to FIG. 16, a flexible seal assembly 18' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the flexible seal assembly 18' includes a base portion 70' and the lip portion 72 as described above with respect to the first embodiment. In the second embodiment, the base portion 70' is modified to have a C-shape contour as viewed in cross-section, such that a recess 80' is formed. The recess 80' defines a fastening portion that receives an inboard edge 42' of the surround trim panel 34 of the instrument panel 14. The inboard edge 42' is basically the same as the inboard edge 42 of the first embodiment, except that the apertures 44 have been omitted.

In the second embodiment, the lip portion 72 is biased into contact with the upper edge portions 50a and 56a of the center console 16.

Third Embodiment

Figure 17:
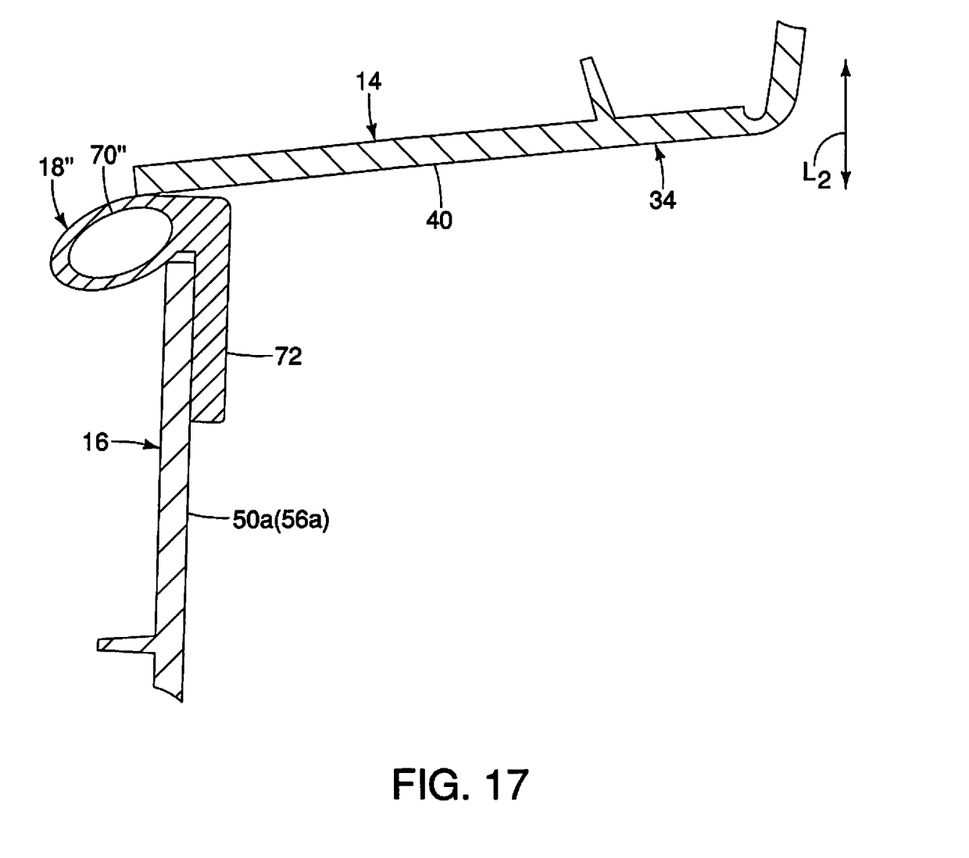
FIG. 17 is a cross-sectional view of the portion of the instrument panel assembly similar to FIGS. 10-13 showing a flexible seal member in accordance with a third embodiment.

Referring now to FIG. 17, a flexible seal member 18" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the flexible seal member 18" includes a base member 70" and the lip portion 72 as described above. The base member 70" is basically a hollow bead that has an arcuate shape in cross-section. The base member 70" (the bead) extends along the length of the flexible seal member 18". The base member 70" (the bead) is dimensioned such that it contacts both the surface 40 (the first surface) of the surround trim panel 34 of the instrument panel assembly 14 and the upper edge portions 50a and 56a (the second surface) covering the gap G. The base member 70" (the bead) is hollow and is inflated such that it fills the gap G and can be pressed or forced into the gap G during installation. Once installed, the base member 70" conforms to the shape of the gap G and is retained therein taking the above mentioned engineering tolerances into account.

The various features of the passenger compartment 12 of the vehicle 10 include many conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle interior trim assembly. Accordingly, these terms, as utilized to describe the present invention should be interpreted relative to a vehicle equipped with the vehicle interior trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior trim assembly, comprising:
   a vehicle structure including a dash wall and a floor that at least partially define a passenger compartment;
   a center console assembly fixedly attached to the floor and having a front upper edge;
   an instrument panel assembly having a central lower surface that faces the front upper edge of the center console, with the central lower surface of the instrument panel assembly and the front upper edge of the center console being spaced apart from one another defining a gap therebetween, the central lower surface defining a plurality of apertures located adjacent to the front upper edge of the center console; and
   a flexible seal member having a plurality of fastening projections that extend through corresponding ones of the plurality of apertures attaching the flexible seal member to the central lower surface, the flexible seal member extending along the gap between the central lower surface of the instrument panel assembly and the front upper edge of the center console thereby covering the gap.

2. The vehicle interior trim assembly, according to claim 1, wherein
   the flexible seal member including the plurality of fastening projections is made of a molded thermoplastic elastomer.

3. The vehicle interior trim assembly, according to claim 1, wherein
   the flexible seal member includes a lip portion that extends from an area of the flexible seal member adjacent to the plurality of fastening projections, the lip contacting and overlaying the front upper edge of the center console.

4. The vehicle interior trim assembly, according to claim 1, wherein
   the flexible seal member includes a lip portion that extends from an area of the flexible seal member adjacent to the central lower surface, the lip contacting and overlaying the front upper edge of the center console.

5. The vehicle interior trim assembly, according to claim 1, wherein
   the flexible seal member has a base portion and a lip portion, the base portion and the lip portion together defining an overall L-shape as viewed in cross-section, the base portion having a first side and a second side, with the plurality of projections extending from the first side of the base portion, and
   the lip portion extending over a surface of the center console adjacent to the front upper edge of the center console, with the front upper edge of the center console being located adjacent to the second side of the base portion.

\* \* \* \* \*